Sept. 19, 1944.　　　　　G. FASSIN　　　　　2,358,321
PHOTOGRAPHIC CAMERA
Filed Sept. 30, 1940　　　　2 Sheets-Sheet 1
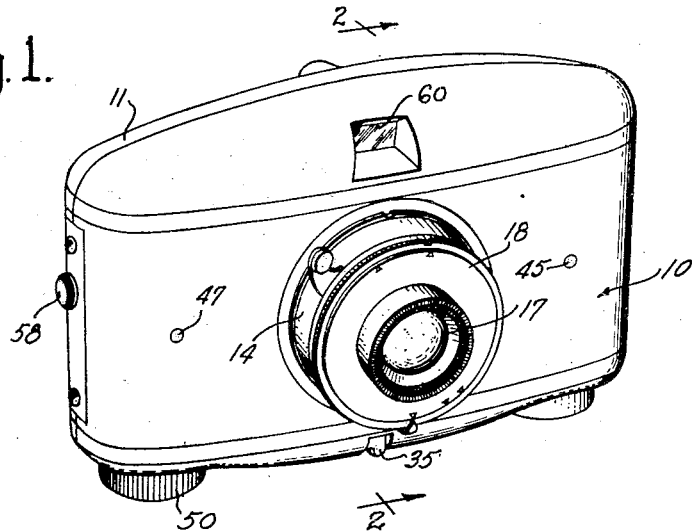
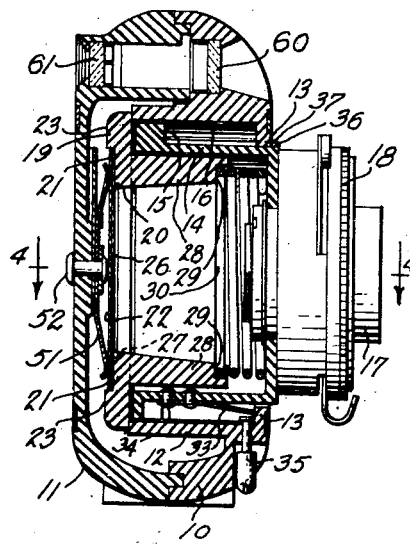 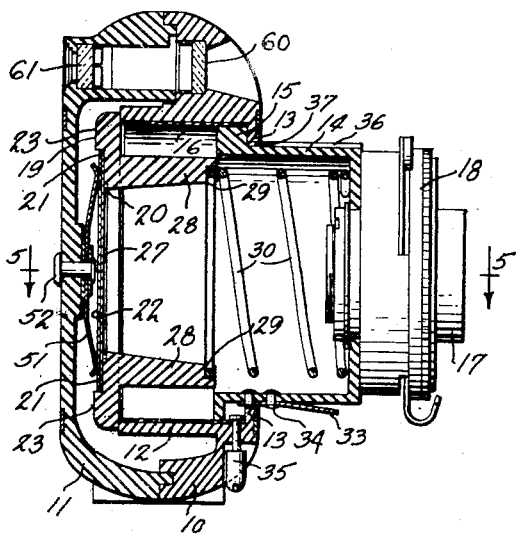
INVENTOR.
Gustave Fassin
BY
Atty.

Sept. 19, 1944. G. FASSIN 2,358,321
PHOTOGRAPHIC CAMERA
Filed Sept. 30, 1940 2 Sheets-Sheet 2
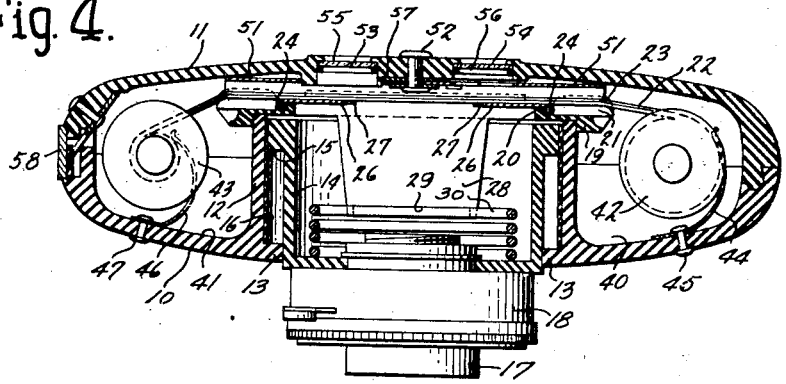
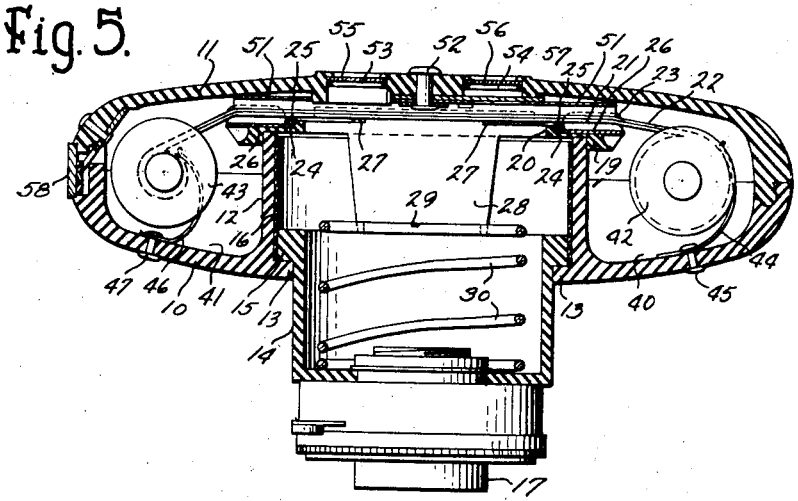
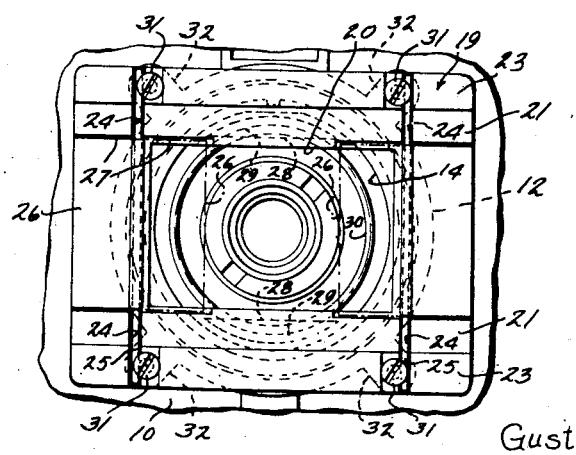
INVENTOR.
Gustave Fassin
BY
Atty.

Patented Sept. 19, 1944

2,358,321

UNITED STATES PATENT OFFICE 2,358,321

PHOTOGRAPHIC CAMERA

Gustave Fassin, Grosse Pointe, Mich., assignor to Argus, Incorporated, a corporation of Michigan Application September 30, 1940, Serial No. 359,116

10 Claims. (Cl. 95—32)

The present invention relates to photographic cameras, and more particularly to folding cameras having provision for taking pictures of different sizes.

One of the objects of the present invention is to provide a new and improved folding photographic camera which is attractive in appearance, simple in construction and rugged in operation. Another object is to provide a simple and inexpensive latch mechanism for holding a folding photographic camera in collapsed position. Another object is to provide a new and improved apparatus for masking a portion of the film at the exposure aperture. A still further object is to provide a camera having masking shutters for covering a portion of the exposure aperture, which shutters are retained in either operative or inoperative position by the photographic film. These and other objects and advantages reside in certain novel features of construction, arrangement and combination of parts as will hereinafter be more fully set forth and pointed out in the appended claims.

In the drawings, Figure 1 is a perspective view of a camera embodying my invention; Figure 2 is a section taken on line 2—2 of Figure 1; Figure 3 is a section similar to Figure 2, showing the camera lens in extended position; Figure 4 is a section taken on line 4—4 of Figure 2; Figure 5 is a section taken on line 5—5 of Figure 3; Figure 6 is a fragmentary elevation of the film aperture plate.

A preferred embodiment of my invention is illustrated in the drawings wherein 10 designates the camera body, to which a camera back 11 is detachably secured in light-tight relation. The camera body 10 is provided with a tubular frame member 12 which has an inwardly extending flange 13 at its front end. A sleeve 14 is axially slidable in the frame member 12 and has an outwardly projecting flange 15 at its rear end. This flange 15 bears against a suitable pile fabric 16 secured to the inner wall of the frame member 12 to form a light-tight connection between the sleeve 14 and frame member 12. The usual objective 17 and shutter 18 are secured at the front end of the sleeve 14 in a manner well known in the art. An aperture plate 19 is formed with a central exposure aperture 20. Two substantially parallel ribs 21 extend longitudinally across the aperture plate 19, one on either side of the aperture 20. These ribs are spaced to form a track for the edges of a film 22 and to hold the central portion of the film away from the remainder of the aperture plate 19. Two ribs 23 also extend longitudinally across the aperture plate 19 beyond the ribs 21. These ribs 23 are raised above the plane of the ribs 21 to engage the edges of the film 22 and retain it in proper position at the exposure aperture.

Two substantially parallel grooves 24 extend transversely across the aperture plate 19, one on each side of the exposure aperture 20. These grooves are formed so that they are well below the plane of the ribs 21 out of the path of the film 22. A pin 25 is rotatably mounted in each groove and these pins extend substantially the entire width of the aperture plate 19. A shutter blade 26 is fixed to each pin between the ribs 21 and is movable from a position outside of the exposure aperture as indicated in Figure 5 and by the full lines of Figure 6 to a position in which it masks a portion of the exposure aperture as indicated in Figure 4 and by the dotted lines in Figure 6. The ribs 21 are cut away as indicated at 27 to provide a place for the shutter blades 26 to rest. It is essential that these blades extend entirely across the aperture 20 so that no light streaks will be formed on the film between the side of the shutter blade 26 and the edge of the exposure aperture 20.

The aperture plate 19 has two lugs 28 which project forwardly within the frame member 12 inside of the sleeve 14. These lugs 28 have their forward ends recessed as indicated at 29 to form seats for a coil spring 30. This spring extends between the seats 29 and the forward end of the sleeve 14 and tends to push the sleeve 14 to the extended position shown in Figures 3 and 5. The aperture plate is secured to the frame member 12 by four screws 31, the heads of which extend over the pins 25 to retain them in the grooves 24. These screws engage in projections 32 formed on the frame member 12.

The latch for holding the sleeve 14 in collapsed position against the pressure of the spring 30 is illustrated in Figures 2 and 3. This latch consists of a flat leaf spring 33 suitably secured to the side wall near the rear end of the sleeve 14 by rivets 34, or the like. The forward end of this spring 33 is bent outward from the wall of the sleeve 14 and engages the flange 13 when the sleeve 14 is in collapsed position. A suitable plunger 35 is slidably mounted in the wall of the camera body 10 beneath the spring 33. The sleeve 14 is thus released from its collapsed position by pressing the plunger 35 which moves the front edge of the spring 33 upward past the edge of the flange 13. The wall of the sleeve 14 is provided with a longitudinal groove 36 opposite the spring 33, and a projection 37 formed on the flange 13 engages in this groove to prevent the sleeve 14 from turning in the frame member 12.

As shown in Figures 4 and 5, the camera body 10 is provided with two cavities 40 and 41, one on each side of the frame member 12. Suitable supply and receiving reels 42 and 43 may be mounted in the cavities 40 and 41 respectively. A leaf spring 44 secured in the cavity 40 by a rivet 45 bears against the film 22 on the supply reel 42, and a similar spring 46, secured by a rivet 47 in the cavity 41, bears against the film on the receiving reel 43. These two springs tend to keep the film taut between the reels 42 and 43. The film from the supply reel 42 passes across the aperture plate 19 and rests on the ribs 21. A winding knob 50 serves to rotate the take-up reel 43 to advance the film. A resilient pressure plate 51 is secured to the rear wall 11 of the camera by a rivet 52, and the edges of this plate press the edges of the film against the ribs 21 to hold the film 22 flat at the exposure aperture. The two windows 53 and 54 are formed in the rear wall of the camera and are covered by suitable filters 55 and 56. The exposure indications on the film 22 can be viewed through these windows 53 and 54. A shutter 57 is pivotally mounted on the rivet 52 between the pressure plate 51 and the rear wall 11. This plate may be selectively moved so as to cover or uncover the window 54. The camera back is secured to the body by a suitable latching mechanism indicated generally at 58.

As shown in Figures 2 and 3, the camera finder consists of a negative lens 60 mounted in the camera body 10, and a positive lens 61 mounted in the rear wall 11. These two lenses 60 and 61 form the usual reversed Galilean finder.

In operation, the user of the camera decides whether he wishes to take full or half-size pictures. Assuming that he decides to take half-size pictures, the shutter blades 26 are moved to the position shown in Figure 4 wherein they partially cover the aperture 20. The shutter 57 is also moved out of the path of the window 56. The film 22 is then placed across the aperture plate 19 from the supply reel 42 to the receiving reel 43, and, as can be seen from Figure 4, the film 22 serves to hold the shutters 26 in position. The film is then wound from the supply reel 42 to the receiving reel 43 by means of the knob 50 until the exposure indications on the film backing appear in alignment with the windows 55 and 56. When the film is in this position, the sleeve 14 may be released by pressing the plunger 35, and the spring 30 moves the sleeve 14 forward to position the lens and shutter in proper exposure position. The camera is then ready to make exposures in the usual way.

If the operator prefers to take full-size exposures, the shutter blades 26 are moved to the position shown in Figure 5 and the shutter 57 is moved to cover the window 54. The operation of the camera is otherwise the same. Suitable masking means not shown can be used in the finder for these two exposure sizes.

From the foregoing, it will be apparent that I am able to attain the objects of my invention and provide a simple, accurate, rugged and inexpensive folding camera for taking exposures of different sizes. While I have illustrated and described my preferred embodiment of my invention, it is readily apparent that various modifications can be made without departing from the spirit of my invention or the scope of the appended claims.

I claim:

1. In a photographic camera, an aperture plate having an exposure aperture therethrough, a pair of parallel raised ribs one on each side of said exposure aperture for supporting the edges of a film at said aperture, and a pair of shutter blades pivotally mounted, one at each end of said aperture between said ribs, the pivotal axes of said blades being substantially perpendicular to said ribs, said blades being movable between an operative position partially closing said aperture and an inoperative position away from said aperture, said blades being held in either the operative or inoperative position by a film resting on said ribs.

2. In a camera, a frame member through which an exposure can be made, an aperture plate having an exposure aperture therein, a pair of spaced ribs on said plate, one on each side of said aperture and extending longitudinally of said plate for supporting the edges of a film, a pair of transverse parallel grooves extending across said plate one adjacent each end of said aperture, a pivot pin in each groove, a shutter blade secured to each pin between said ribs, said shutter blades being selectively adjustable to a position partially closing said aperture, means for securing said plate to said frame member and means for holding said pins in said grooves.

3. In a camera, a frame member through which an exposure can be made, an aperture plate having an exposure aperture therein, a pair of spaced ribs on said plate, one on each side of said aperture and extending longitudinally of said plate for supporting the edges of a film, a pair of transverse parallel grooves extending across said plate one adjacent each end of said aperture, a pivot pin in each groove, a shutter blade secure to each pin between said ribs, said shutter blades being selectively adjustable to a position partially closing said aperture, and a plurality of screws for securing said plate to said frame member, said screws projecting over said pins and holding said pins in said grooves.

4. In a photographic camera, a camera body having a tubular frame member through which an exposure can be made, a tubular sleeve slideably mounted in said frame member, interengaging flanges on the front end of the frame member and the rear end of the sleeve for limiting the movement of said sleeve in one direction, an aperture plate having an exposure aperture therethrough, a pair of shutter blades, pivot pins extending outward from one edge of each shutter blade, headed screws for securing said plate over the rear end of said frame member, the heads of said screws extending over said pivot pins and pivotally securing said blades to said plate adjacent each end of said aperture, and spring means between said aperture plate and said sleeve for urging said sleeve in the direction limited by said flanges.

5. In a photographic camera, a camera body having a tubular frame members through which an exposure can be made, a tubular sleeve slideably mounted in said frame member, interengaging flanges on the front end of the frame member and the rear end of the sleeve for limiting the movement of said sleeve in one direction, an aperture plate having an exposure aperture therethrough, a pair of shutter blades, pivot pins extending outward from one edge of each shutter blade, headed screws for securing said plate over the rear end of said frame member, the heads of said screws extending over said pivot pins and pivotally securing said blades to said plate adjacent each end of said aperture, latch means carried by said sleeve for holding the sleeve against the action of said spring and manually operable means carried by said camera for releasing said latch.

6. In a photographic camera, a camera body having a tubular frame member through which an exposure can be made, a tubular sleeve slideably mounted in said frame member, interengaging flanges on the front end of the frame member and the rear end of the sleeve for limiting the movement of said sleeve in one direction, an aperture plate having an exposure aperture therethrough, a pair of shutter blades, pivot pins extending outward from one edge of each shutter blade, headed screws for securing said plate over the rear end of said frame member, the heads of said screws extending over said pivot pins and pivotally securing said blades to said plate adjacent each end of said aperture, a leaf spring secured at one end to the side wall of said sleeve, the free end of said leaf spring extending outwardly from said wall to engage the flange on the frame member and hold the sleeve against the operation of the spring means and a plunger slideably mounted in said camera body and extending through the frame member for disengaging said leaf spring from said flange.

7. In a photographic camera, a camera body having a tubular frame member through which an exposure can be made, a tubular sleeve slideably mounted in said frame member, interengaging flanges at the front end of the frame member and the rear end of said sleeve for limiting the movement of the sleeve in one direction, an aperture plate having an exposure aperture therethrough, a pair of parallel raised ribs on said plate, one on each side of said exposure aperture for supporting the edges of a film at said aperture, said plate having a pair of parallel grooves one at each end of said aperture extending across said ribs, a pivot pin in each groove, a shutter carried by each pivot pin between said ribs, securing means for fastening said plate at the rear end of said frame member, said securing means extending over said grooves to retain said pins in said grooves and spring means between said plate and said flange for urging said sleeve in the direction limited by said flanges.

8. In a photographic camera, a camera body having a tubular frame member through which an exposure can be made, a tubular sleeve slideably mounted in said frame member, interengaging flanges at the front end of the frame member and the rear end of said sleeve for limiting the movement of the sleeve in one direction, an aperture plate having an exposure aperture therethrough, a pair of parallel raised ribs on said plate, one on each side of said exposure aperture for supporting the edges of a film at said aperture, said plate having a pair of parallel grooves one at each end of said aperture extending across said ribs, a pivot pin in each groove, a shutter carried by each pivot pin between said ribs, securing means for fastening said plate at the rear end of said frame member, said securing means extending over said grooves to retain said pins in said grooves, latching means carried by the sleeve for holding said sleeve against the action of said spring means, and manually operable means on the camera body for releasing said latching means.

9. In a photographic camera, a camera body having a tubular frame member through which an exposure can be made, a tubular sleeve slideably mounted in said frame member, interengaging flanges at the front end of the frame member and the rear end of said sleeve for limiting the movement of the sleeve in one direction, an aperture plate having an exposure aperture therethrough, a pair of parallel raised ribs on said plate, one on each side of said exposure aperture for supporting the edges of a film at said aperture, said plate having a pair of parallel grooves one at each end of said aperture extending across said ribs, a pivot pin in each groove, a shutter carried by each pivot pin between said ribs, securing means for fastening said plate at the rear end of said frame member, said securing means extending over said grooves to retain said pins in said grooves, a pair of projections on said aperture plate, one on each side of said aperture extending forwardly from said plate within said sleeve, seating means at the forward end of each projection and a spring seated in said seating means and extending forwardly into engagement with said sleeve for urging said sleeve in the direction limited by said flanges.

10. In a photographic camera, a camera body having a tubular frame member through which an exposure can be made, a tubular sleeve slideably mounted in said frame member, spring means between said frame member and said sleeve for urging said sleeve outwardly, interengaging flanges on said frame and said sleeve for limiting outward movement of said sleeve into projected position under the influence of said spring means, a leaf spring secured at one end to the side wall of said sleeve, said spring being disposed entirely within the space between said flanges when said sleeve is collapsed into the camera body and the free end of such spring extending outwardly from said wall and engaging the inner side of said flange on said frame member for holding the sleeve collapsed into said body against the action of said spring, and a plunger slideably mounted in said camera body and extending through said frame member into the space between said flanges, for engaging said leaf spring to disengage said leaf spring from said flange and flex it inwardly past the inner edge of said last named flange.

GUSTAVE FASSIN.